United States Patent
Kofune et al.

(10) Patent No.: US 6,991,370 B2
(45) Date of Patent: Jan. 31, 2006

(54) TEMPERATURE MEASURING APPARATUS OF HIGH MELTING POINT METAL CARBIDE-CARBON SYSTEM MATERIAL THERMOCOUPLE TYPE, AND METHOD FOR PRODUCING THE APPARATUS

(75) Inventors: Shigeo Kofune, Takasago (JP); Takao Fujikawa, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 10/623,521

(22) Filed: Jul. 22, 2003

(65) Prior Publication Data
US 2004/0161014 A1 Aug. 19, 2004

(30) Foreign Application Priority Data
Jul. 23, 2002 (JP) .............................. 2002-214316

(51) Int. Cl.
G01K 7/02 (2006.01)
G01K 7/04 (2006.01)
H01L 35/12 (2006.01)
H01L 35/00 (2006.01)

(52) U.S. Cl. ................. 374/179; 136/236.1; 136/239; 136/240

(58) Field of Classification Search ................ 374/179, 374/208, 163, 100; 136/230, 239, 240, 236.1, 136/228
See application file for complete search history.

(56) References Cited

U.S. PATENT DOCUMENTS

| | | | | |
|---|---|---|---|---|
| 1,823,706 A | * | 9/1931 | Staehle | ........................ 136/239 |
| 2,712,563 A | * | 7/1955 | Faus et al. | ................... 136/238 |
| 2,946,835 A | * | 7/1960 | Westbrook et al. | ......... 136/239 |
| 3,421,953 A | * | 1/1969 | Wohlberg et al. | ............ 148/210 |
| 4,572,677 A | * | 2/1986 | Sehgal | ........................ 374/144 |
| 4,732,620 A | * | 3/1988 | Hunold et al. | ............... 136/228 |
| 5,092,938 A | * | 3/1992 | Kanda et al. | ................ 136/230 |
| 6,458,218 B1 | * | 10/2002 | Savich | ........................ 148/237 |

FOREIGN PATENT DOCUMENTS

| | | | |
|---|---|---|---|
| JP | 63-169081 | | 7/1963 |
| JP | 58161836 A | * | 9/1983 |
| JP | 01233332 A | * | 9/1989 |
| JP | 3-17075 | | 3/1991 |
| JP | 7-55586 | | 3/1995 |

* cited by examiner

*Primary Examiner*—Gail Verbitsky
*Assistant Examiner*—Mirellys Jagan
(74) *Attorney, Agent, or Firm*—Oblon, Spivak, McClelland, Maier & Neustadt, P.C.

(57) ABSTRACT

The temperature measuring apparatus according to the present invention is of the high melting point metal carbide—carbon system material thermocouple type. According to this temperature measuring apparatus, it is possible to measure temperatures from a room temperature range to a high temperature range in excess of 2000° C. continuously, stably and with good accuracy. A constitution is preferable wherein a rod-like member formed of high melting point metal carbide is inserted into a pipe-like member with a bottom formed of carbon system material, and connected at the bottom to serve as a temperature measuring portion.

14 Claims, 3 Drawing Sheets

TEMPERATURE MEASURING APPARATUS OF HIGH MELTING POINT METAL CARBIDE-CARBON SYSTEM MATERIAL THERMOCOUPLE TYPE, AND METHOD FOR PRODUCING THE APPARATUS

BACKGROUND OF THE INVENTION

1. Field of the Invention

The present invention relates to a temperature measuring technique of a high melting point metal carbide—carbon system material thermocouple type, and method for producing the apparatus, and in more detail, relates to the temperature measuring technique suitable for measuring a high temperature exceeding 2000° C., and particularly, relates to a temperature measuring apparatus capable of continuously carrying out temperature measurement from a room temperature to a maximum temperature in an apparatus having a vertical type electric furnace construction as represented by a hot isostatic (HIP) apparatus.

2. Description of the Related Art

In the high temperature process being utilized industrially, the success or failure of the process greatly depends on the reliability of accuracy of temperature measurement, reproducibility and the like. As the industrial temperature measuring technique, a thermocouple has been often used recently in view of accuracy of temperature measurement and simplicity. However, at present, in the high temperature range exceeding 2000° C., the mere usable thermocouple is limited to a tungsten—rhenium (W—Re) system thermocouple. However, in the commercial production of the W—Re thermocouple, those other than element wires of thermocouple whose diameter is 0.5 mm are not general, and due to the fact that a wire drawing method is used in producing the fine-diameter thermocouple element wires, when the element wires are used in the high temperature range in excess of 1600° C., they tend to be broken easily due to the embrittlement phenomenon resulting from higher-degree of crystal grain growth of the thermocouple element wires to shorten the service life, thus posing a problem that the breakage thereof often occurs in the midst of actual use. Further, there is a basic problem in that at high temperatures substantially in excess of 2300° C., the temperature measurement cannot be made by the W—Re system thermocouple.

For overcoming the problem of the breakage resulting from the fine-diameter thermocouple element wires according to the wire drawing method of the W—Re system thermocouple, there has been proposed, (see Japanese Patent Publication No. 17075/1991 Publication), a W—Re system thermocouple employing the construction in which using a large-diameter (3 to 5 mm) rod-like tungsten (W) and tungsten-rhenium (W—Re) system materials, one ends of these two rods are connected by the thread construction using a button-like connecting member formed of any metal, and the entirety is encased into a sheath formed of a heat insulating material such as a high melting point metal or boron nitride (BN), which is used as the thermocouple for HIP apparatus capable of carrying out operation in the high temperature range up to approximately 2200° C. It is proved that this thermocouple can be used in the stabilized manner for a period of time to a degree not industrially posing a problem in the temperature range up to 2200° C., which is being used mainly for the HIP process of silicone nitride ceramics. However, in the actual circumstances, at the high temperature exceeding 2200° C., there still remains a problem in terms of stability in case of a long-term use.

On the other hand, a thermocouple having a boron carbide sintered body rod and a pipe with a graphite bottom connected by insert construction at upper ends thereof has been sold by ESK (Electro Schmelzwerk Kempten) Ltd. This thermocouple is also able to make temperature measurement from a room temperature to a considerably high temperature range, but leaves a problem of stability of thermal electromotive force and a problem of being insufficient for continuous temperature measurement at 2300° C. since the upper limit of using temperature is less than 2300° C. at the most. In the thermocouple comprising a combination of the boron carbide sintered body and graphite, there has been experienced that the boron carbide sintered body is used as electrode material, but since density of the sintered body is not 100%, for example, when used for high temperature measurement in excess of 2000° C. in the HIP apparatus, the sintering further progresses to shorten the length of a boron carbide sintered body rod material. This is caused by the fact that since most of high-purity carbides has a high melting point, and despite high-density sintering cannot be done by a normal sintering method unless a sintering assistant is added, the use of the sintering assistant is not allowed because of being greatly affected by the use of an additive such as a sintering assistant, for securing stability of thermal electromotive force.

In view of the aforementioned circumstances, in the actual circumstances, in the apparatus used for the processing process in a temperature range exceeding 2000° C., for example, such as a high temperature sintering furnace, a hot press apparatus and part of HIP apparatus, an optical temperature measuring technique such as a two-color thermometer making use of radiant light is often used. However, in the case of the optical temperature measurement technique, the sufficient temperature accuracy is not obtained unless temperature is high in excess of 1000 to 1100° C. at which intensity of the radiant light becomes high, posing a problem that it cannot be used unless the temperature is substantially above such a temperature range as described. Consequently, in fact, there has been taken a procedure that at a temperature below the above temperature range, a temperature measurement apparatus capable of measuring is used, and for example, in case of an electric furnace, power is put according to a predetermined program, and in a temperature range in excess of 1000 to 1100° C. at which output of an optical temperature measuring apparatus is detected, an input of a temperature control device is switched to the optical temperature measuring apparatus to control temperatures, which procedure is very hard to use in the actual circumstances.

As mentioned above, there has been known, as the temperature measuring technique in the high temperature process being utilized industrially, a W—Re thermocouple using a rod-like electrode, a thermocouple having a boron carbide sintered body and graphite combined or an optical temperature measuring apparatus. However, in the W—Re thermocouple or the thermocouple having a boron carbide sintered body and graphite combined, it is possible to measure temperature up to a high temperature of approximately 2000° C., but when exceeding 2300° C. above 2000° C., the stabilized temperature measurement cannot be expected. In addition, in the case of the later thermocouple having a boron carbide sintered body and graphite combined, there is a possible problem that when it is applied to a processing apparatus to which pressure is applied as in the HIP apparatus, sintering further progresses to shorten the length of the boron carbide sintered rod. On the other hand, in the optical temperature measuring apparatus, the sufficient temperature accuracy is obtained at a high temperature of 1000 to 1100° C. or above, but conversely, at 1000° C. or below, the sufficient accuracy of temperature measurement cannot be expected.

The present invention has been accomplished in order to overcome the aforementioned problems. The object provides a temperature measuring apparatus of a high melting point metal carbide—carbon system material type capable of continuously, stably and precisely measuring temperatures up to the range from a room temperature to a high temperature in excess of 2000° C. irrespective of presence or absence of pressure in order to control the high temperature process with good accuracy.

SUMMARY OF THE INVENTION

For achieving the aforementioned object, the present invention has the constitution as described below. That is, the present invention provides a temperature measuring apparatus of a thermocouple type, comprising: a member formed of a high melting point metal carbide; and a member formed of carbon system material, wherein the member formed of a high melting point metal carbide; and the member formed of carbon system material are connected, and the connected portion serves as a temperature measuring portion.

In the temperature measuring apparatus of a thermocouple type according to the present invention, both the member formed of a high melting point metal carbide and the member formed of carbon system material have a rod-like portion, an end of the member formed of a high melting point metal carbide and an end of the member formed of carbon system material are connected using a connecting member formed of either material of the member formed of a high melting point metal carbide or the member formed of carbon system material to serve as a temperature measuring portion. Here, the end of the member formed of a high melting point metal carbide is formed with an external thread, and the connecting member is formed with an internal thread to provide a thread connection therebetween. As described, the member formed of a high melting point metal carbide and the member formed of carbon system material sometimes include a connecting member used for connecting both the members.

Or, in the temperature measuring apparatus of a thermocouple type according to the present invention, the member formed of a high melting point metal carbide is rod-like and the member formed of carbon system material is pipe-like with a bottom, and the member formed of a high melting point metal carbide is inserted into the member formed of carbon system material and connected at the bottom to serve as a temperature measuring portion. Here, the end of said member formed of a high melting point metal carbide is formed with an external thread, and the bottom of said member formed of carbon system material is formed with an internal thread to provide a thread connection therebetween.

The high melting point metal carbide termed in the present invention includes carbide in which metal having a melting point not less than 2000° C. generally called "High melting point metal". In addition, it also includes metal carbide whose melting point exceeds 3000° C. Here, the high melting point metal carbide is preferably carbide of either one kind of tungsten, tantalum, titanium, hafnium, niobium, or zirconium. Further, among them, use of WC, TaC, TiC, HfC, NbC and ZrC is preferred.

In the temperature measuring apparatus of a thermocouple type according to the present invention, the carbon system material is preferably graphite. As carbon system materials other than graphite, use may be made of, for example, a material in which carbon fiber is formed to be string-like.

In the temperature measuring apparatus of a thermocouple type according to the present invention, the member formed of high melting point metal carbide is produced by covering a high melting point metal rod material with carbon powder, and the entirety is compressed in a high temperature condition to carbonize it. Further, the outer circumferential portion of said member formed of high melting point metal carbide is ground, and the end thereof is formed with an external thread by supersonic process or discharge process. For example, where the member formed of a carbon system material is pipe-like with a bottom, the outer circumferential portion of said member formed of high melting point metal carbide is ground, and the end thereof is formed with an external thread by supersonic process or discharge process, and an internal thread is formed on a bottom of the member formed of carbon system material, and the apparatus is formed into a thermocouple type by connecting the external thread and the internal thread.

The present invention constituted as described above will be described in further detail hereinafter.

For measuring high temperatures in excess of 2000° C., a material having heat resistance, that is, a material of a high melting point is necessary, and for using as a thermocouple, it is necessary to connect two kinds of materials at a temperature measuring section on the side for measuring high temperatures. Further, it is requested that these materials can be formed into a wire or a rod-like, and the entirety is uniform in terms of composition (purity).

Most of carbide materials have a high melting point. Among them, a carbide material handled by the present invention is carbide of high melting point metal, for example, such as tungsten carbide (WC), tantalum carbide (TaC), hafnium carbide (HfC), niobium (NbC), and zirconium (ZrC). The reason why the present invention is limited to carbide of a high melting point metal is that carbide (BC) of boron like semi-metal has a high melting point, but it has to be molded by sintering, and it is necessary to add a sintering assistant at that time, thus being difficult to mold it into an elaborate rod material. On the other hand, in case of carbide of high melting point metal, it is possible to mold an elaborate rod material as will be described later.

Further, even the high melting point metal carbide, most of these material systems forms more than two kinds of carbides. For example, carbide of tungsten includes carbide indicated at chemical symbol of $W_2C$ in addition to the above-described WC. However, it is preferred that the carbide handled by the present invention is limited to carbide of composition on the side closest to carbon in the status view of a two-element system of the high melting point metal material and carbon. The reason why is that there occurs a problem that in case of the thermocouple construction, graphite (carbon) is used as a mating electrode. Therefore, unless carbide which contains the greatest quantity of carbon is used, the carbon atom is moved due to the diffusion phenomenon from the electrode on the graphite side, and for example, if $W_2C$ is used, WC is formed from a junction with graphite. Therefore, a variation of a thermal electromotive force occurs.

Further, taking a two-element system of tungsten and carbon as an example, there exists a eutectic point (eutectic temperature: 2735° C.) in the composition area between $W_2C$ and WC, and therefore, the melting phenomenon occurs at this temperature but the eutectic point is not present in the composition area between WC and C, because of which no melting occurs up to a melting point of WC (approximately 2780° C.). Table 1 gives the melting point of high melting point metal carbide including WC and the eutectic temperature. Since these values are difficult to measure, an error to a degree of ±50° C. is expected.

TABLE 1

| System | Melting point of carbide (° C.) | Eutectic temp. (° C.) |
|---|---|---|
| HfC—C | 3950 | 3180 |
| NbC—C | 3600 | 3220 |
| TaC—C | 3985 | 3445 |
| TiC—C | 3067 | 2776 |
| WC—C | 2780 | — |
| Zr—C | 3540 | 2927 |

As given in Table 1, the high melting point metal carbide material to be handled by the present invention has a melting point equal to or more than a temperature of 3750° C. at which carbon (graphite) of the mating material, and is usable enough to temperature measurement at a high temperature range in excess of 2000° C.

DESCRIPTION OF THE PREFERRED EMBODIMENTS

Figure 1:
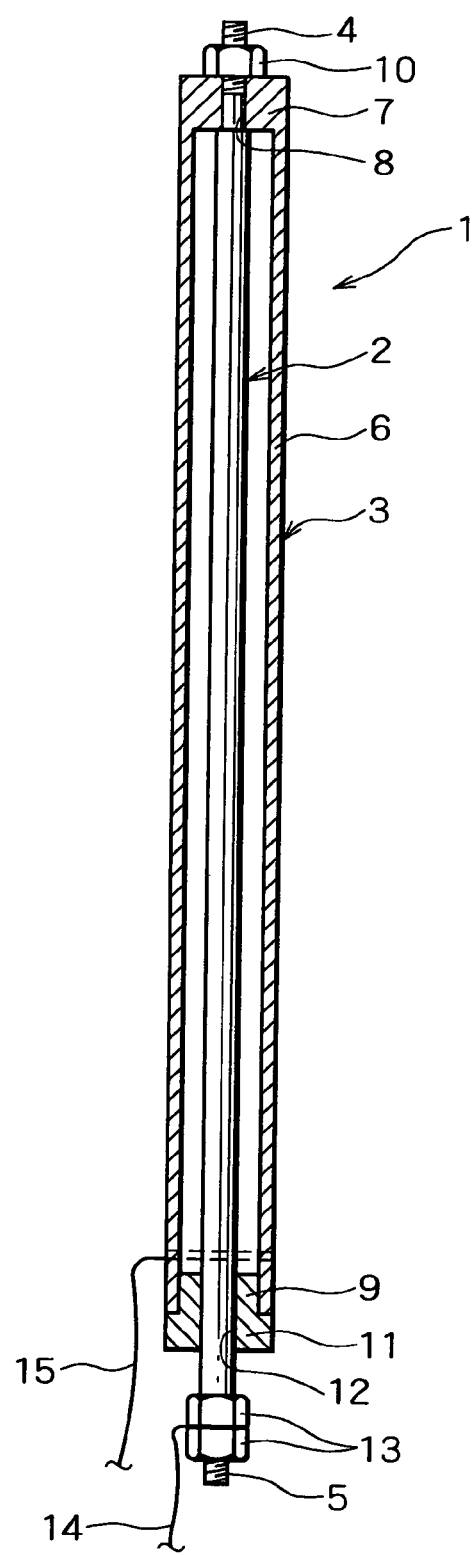
FIG. 1 is a sectional view of a thermocouple unit constituting the main parts of a temperature measuring apparatus of a high melting point metal carbide—carbon-system material thermocouple type according to the present invention.

The embodiments of the present invention will be described hereinafter with reference to the accompanying drawings. FIG. 1 is a sectional view of a thermocouple unit constituting the main parts of a temperature measuring apparatus of a high melting point metal carbide—carbon-system material thermocouple type according to the present invention. In the figure, the reference numeral 1 denotes a thermocouple unit; 2 a high melting point metal carbide rod-like member; and 3 a pipe-like member with a bottom made of carbon-system material.

The high melting point metal carbide rod-like member 2 constitutes one electrode, opposite ends of which are formed with external threads 4 and 5, respectively.

The pipe-like member with a bottom made of carbon-system material 3 constitutes the other electrode, which comprises a pipe portion 6 and a bottom portion 7 which is formed in the central portion with a through-hole 8. The bottom portion 7 side is a temperature measuring portion on the high temperature side when temperature is measured. As the carbon-system material, graphite was used.

The thermocouple unit 1 is constituted such that the high melting point metal carbide rod-like member 2 is inserted into the pipe portion 6 from the opening 9 side of the pipe portion 6 of the pipe-like member with a bottom made of carbon-system material 3, the external thread 4 side on one end of the high melting point metal carbide rod-like member 2 is inserted into the through-hole 8 of the bottom portion 7 and is fixed, on the external side of the bottom portion 7, by a nut 10 manufactured of either material of carbon material (graphite) or high melting point metal carbide, whereas the external thread 5 side of the high melting point metal carbide rod-like member 2 is inserted into a through-hole 12 of an electric insulating member 11. The electric insulating member 11 is fixed to the opening 9 of the pipe-like member with a bottom made of carbon-system material 3. The high melting point metal carbide rod-like member 2 arranged internally of the pipe-like member with a bottom made of carbon-system material 3 is suspended on the pipe-like member with a bottom made of carbon-system material 3 at the bottom portion 7.

The reason for the provision of the constitution as described above is that since there is a difference in the coefficient of thermal expansion between the high melting point metal carbide rod-like member 2 and the pipe-like member with a bottom made of carbon-system material 3, a thermal stress is generated by the thermal expansion to deform or break a member which is weak in strength. Therefore, the influence of an elongation caused by the thermal expansion need be avoided. On the other hand, because of being provided with the constitution as described above, a consideration is made so that the electric insulating member 11 is arranged in order that the high melting point metal carbide rod-like member 2 is not in contact with the pipe-like member with a bottom made of carbon-system material 3 at portions other than the external thread 4 side. Electric junctions are not formed at portions other than the temperature measuring portion on the external thread 4 side.

Further, nuts 13 made of high melting point metal carbide is mounted on the external thread 5 of the high melting point metal carbide rod-like member 2, and a lead wire 14 formed of a conductive material is connected by the nuts 13, 13. A lead wire 15 is connected also on the opening 9 side of the pipe-like member with a bottom made of carbon-system material 3. These lead wires 14 and 15 are connected to a voltmeter (not shown).

The thermocouple unit 1 constituted as described above is, for example, in case of HIP device 1 (not shown), mounted internally of the heating apparatus within the high pressure vessel by a support member for measurement of temperature. In this case, the thermal electromotive force is input into a thermal power conversion meter (a voltmeter having a cooling junction temperature compensation function) placed under atmospheric pressure through a connector member passing through a member such as a lower lid of the high pressure vessel by the lead wires 14 and 15. When temperatures of the external thread 5 side of the high melting point metal carbide rod-like member 2 and the opening 9 side (an end on the low temperature side) of the pipe-like member with a bottom made of carbon-system material 3 is different from the temperature of an input terminal portion of the thermal electromotive force conversion meter, an error in measurement of temperature caused by the temperature difference occurs. Therefore, it is suggested that the temperature of the low temperature end be placed in the state as close as possible to the room temperature. In this manner, in the high temperature process, for example, as in the HIP device, it is possible to measure a temperature in the range from a room temperature to a high temperature range above 2000° C. stably and accurately.

Figure 2:
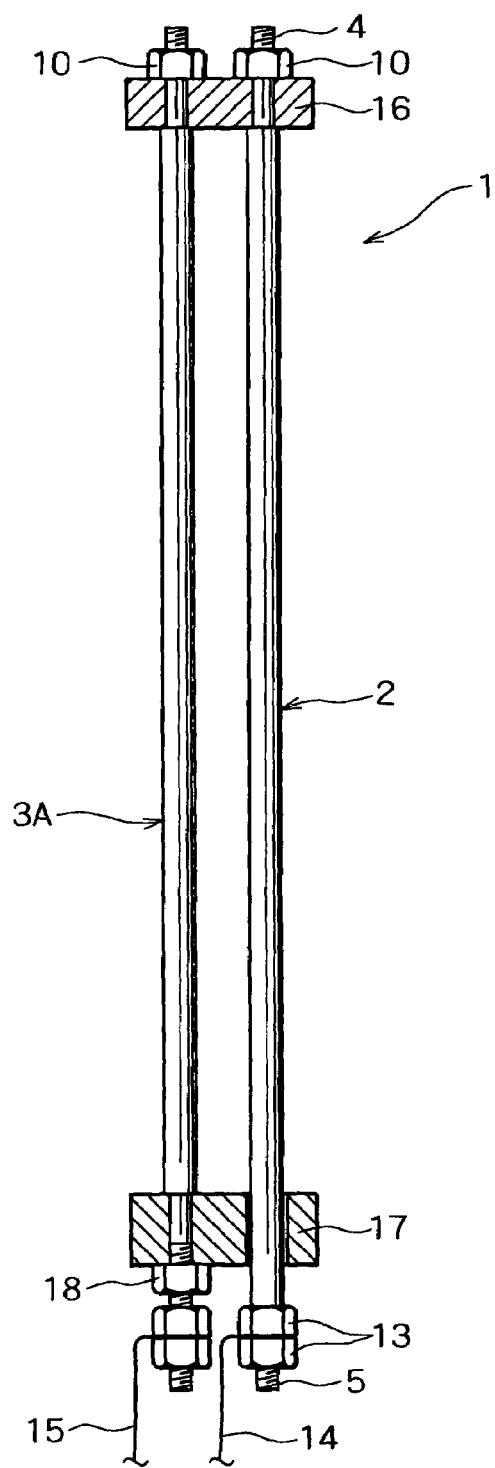
FIG. 2 is a sectional view of a thermocouple unit constituting the main parts of a temperature measuring apparatus of a high melting point metal carbide—carbon-system material thermocouple type according to a further embodiment of the present invention.

In the above-described embodiment, a description has been made taking the pipe-like member with a bottom made of carbon-system material 3 as an example. Because, by employing the shape of the pipe with a bottom as described, it is possible to prevent the denaturation of the high melting point metal carbide rod-like member 2 caused by impurities in the atmosphere gas of the temperature measuring apparatus. However, the present invention is not limited thereto, but even if the pipe-like member with a bottom made of carbon-system material 3 is modified to be a rod-like member similarly to the high melting point metal carbide rod-like member 2, the function as the thermocouple is displayed similarly to that mentioned above. In this case, a construction is employed, as shown in FIG. 2, so that a relative position is not displaced by a nut 18, by using a connecting member 16 having two through-holes formed of either material for a rod-like member made of a carbon system material 3A and a temperature measuring portion side of the high melting point metal carbide rod-like member 2, and by using a connecting member made of an electric insulating material 17 likewise having two through-holes for the low temperature side. As for the fixing method with respect to the temperature measuring apparatus, a construction is employed, similarly to the case of the above-described embodiment, such that only the electrode on one side or the connecting member made of an electric insulating material 17 is fixed to the low temperature portion of the apparatus and the other electrode is suspended.

Further, in the above-described embodiment, a description has been made in which the external thread 4 side on one end of the high melting point metal carbide rod-like member 2 is inserted into the through-hole 8 of the bottom portion 7 of the pipe-like member with a bottom made of carbon-system material 3 and fixed by the nut 10 externally of the bottom portion 7. However, the present invention is not limited to that embodiment, but in place of the through-hole 8 of the bottom portion 7 of the pipe-like member with a bottom made of carbon-system material 3, an internal thread may be formed, and the external thread 4 may be screwed into the internal thread directly to connect them. Further, also with respect to the connection between the external thread 5 of the high melting point metal carbide rod-like member 2 and the electric insulating member 11 and the connection between the rod-like member made of carbon system material 3A or the high melting point metal carbide rod-like member 2 and connecting members 16 and 17, the direct thread connection may be likewise employed.

Now, the method for producing the temperature measuring apparatus of the high temperature metal carbide—carbon system material thermocouple type according to the present invention will be described below.

The characteristic of the temperature measuring apparatus of thermocouple type according to the present invention, particularly the long-term stability is decided by the purity, strength or the like of the high melting point metal carbide rod-like member. The use of the rod-like carbide produced by the normal sintering method is also included in the scope of the present invention. As the more suitable high melting point metal carbide rod-like member, a member produced by a producing method by the present inventors shown below is preferred.

That is, this is a method of producing a temperature measuring apparatus of a high melting point metal carbide—a carbon system material thermocouple type wherein the high melting point metal rod material is covered with carbon powder, and the entirety is compressed in the high temperature condition to thereby carbonize the high melting point metal rod material, thus obtaining a high temperature metal carbide rod-like member. Then, the outer circumference of the high melting point metal carbide rod-like member is ground, the end thereof is formed with an external thread by supersonic process or discharge process, to which external thread is connected a pipe-like member with a bottom formed of a carbon system material processed and applied with an internal thread on the bottom (a pipe-like member with a bottom made of a carbon system material) to provide a thermocouple.

As mentioned above, the carbide of the high melting point metal, particularly, WC, HfC, TaC, TiC, NbC, or ZrC as used in the present invention is higher in melting point than that of the original high melting point metal material. A normal pressure or vacuum sintering method normally used for producing products formed of normal high melting point metal or carbon thereof has a problem that a density member is not obtained unless additive termed a sintering assistant is added. Particularly, where use is made as the thermocouple in the present invention, the uniform composition and high density are essential conditions, and the normal sintering method is not always suitable for producing a high melting point metal carbide rod-like member as used for the purpose of the present invention. Further, since the shape is a small-diameter and long rod-like shape close to a wire, a sintering method using normal powder as raw material involves many technical problems for molding and sintering powder, being accompanied by many difficulties for application. The present invention has paid attention to the fact that as the high melting point metal to be raw material for the carbide, wires or small-diameter rod materials are commercially available and easily available. The wires or rod materials are reacted with carbon into a wire or a rod-like carbide. The wire or rod-like carbide, namely high melting point metal carbide material is subjected to machining to produce a thermocouple type temperature measuring apparatus of the present invention.

Figure 3:
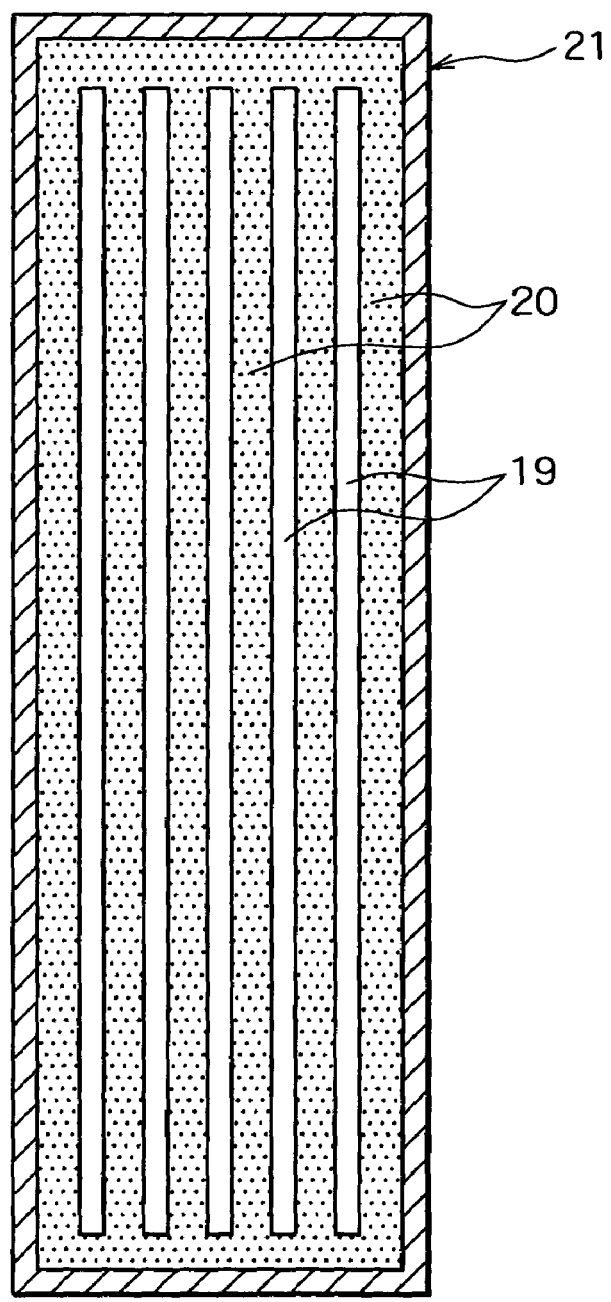
FIG. 3 is an explanatory view conceptually showing a method of producing a high melting point metal carbide rod-like element according to the present invention.

FIG. 3 conceptually shows the method for producing a high melting point metal carbide rod-like element material according to the present invention. In the present embodiment, in the state that carbon powder 20 is filled in the circumference of a high melting point metal rod 19, it is vacuum sealed into a capsule 21 made of metal or glass to apply HIP process thereto whereby the high melting point metal rod 19 is reacted with carbon to produce a rod-like high melting point metal carbide (a high melting point metal carbide rod-like member). In the reaction in which the high melting point metal rod 19 is reacted with carbon under the high temperature, the high melting point metal itself produces volume expansion. At this time, there sometimes occurs a gap in an interface between carbide as a reaction product and the original high melting point metal, but if the HIP process is used, high pressure acts under the high temperature, because of which no such a gap as described occurs, fine carbide can be obtained. The temperature of the HIP process is different depending on the kind of the original high melting point metal material, but when the diameter of the high melting point metal rod is not more than 5 mm, at least a high temperature over 1000° C. is necessary, but if the temperature is 1500 to 2000° C., the whole high melting point metal rod can be converted into carbide in a period of the reaction time of approximately 1 to 4 hours.

In the HIP process in such a high temperature range, the problem is the selection of a material for the capsule 21 used, and quartz glass or high melting point metal is used. When the high melting point metal is used, there is suggested a method wherein it is constituted by a pipe-like member with a bottom having a wall-thickness of 0.3 to 0.5 mm and a member for closing an open end, carbon powder 20 and a rod-like high melting point metal (may be of plural as shown in the figure) 19 are put into the capsule 21. Afterwards, vacuum-sealed by an electron beam (EB) welding method.

Naturally, the capsule 21 is also carbonized during the HIP process. If the airtightness internally of the capsule 21 is held in the first process of fineness, the fineness can be accomplished by the HIP process. However, after the HIP process, since the material of the capsule 21 is brittle due to the carbonization and the wall-thickness is thin, the merits of easiness of removal of the capsule 21 is provided.

Where the material of the capsule 21 is quartz glass, there is a merit that the quartz tube is available relatively easily. The carbon powder 20 and the high melting point metal 19 are put into the quartz tube whose one end is closed, and afterward, heated by a city gas—oxygen flame burner while carrying out vacuum drawing with a vacuum drawing hose mounted in an opening on the other end to enable carrying out vacuum sealing work, thus requiring no expensive EB welding machine. However, since the quartz glass tends to be broken, attention need be paid to pressurizing speed and handling of a capsule during the HIP process.

In the high melting point metal carbide rod-like member obtained by the HIP process, there is present rugged portions on the external surface thereof. Therefore, they are flattened by grinding or the like, and an external thread is formed on the end portion and processed into the shape and dimension of the high melting point metal carbide rod-like member applied to the thermocouple type temperature measuring apparatus according to the present invention described above. The thus produced high melting point metal carbide rod-like member is inserted into a pipe-like member with a bottom made of carbon material (graphite) separately prepared, and an electric insulating member is mounted to complete it as a thermocouple type.

As described above, according to the temperature measuring apparatus of the high melting point metal carbide—carbon system material thermocouple type according to the present invention, the temperature measurement in the range from the room temperature to the high temperature in excess of 2000° C. is carried out by a simple method and extremely economically, greatly contributing the development of the future super-high temperature process, particularly, the process with which gas pressure is combined.

Further, in the measurement of high temperature in excess of 2000° C., the continuous temperature measurement from the room temperature range to the high temperature range in excess of 2000° C. becomes enabled without using an optical temperature measuring procedure. Further, the process for holding temperatures in two stages of low temperature and high temperature can be also controlled with good accuracy.

Furthermore, in the case of the process under the high pressure gas atmosphere as in the HIP process or in the case of the pressure atmosphere sintering, in the optical temperature measuring procedure, it is necessary for taking out light as a signal to use an optical transmission window formed from quartz glass or an optical fiber. Since glass tends to be broken and at the same time the pressure resistance is demanded, there are many problems. However, according to the present invention, even if the gas pressure exerts on the temperature measuring apparatus, isostatic pressure exerts but not being a pressure resisting member construction, no breakage occurs. It can be used even under the high pressure gas atmosphere as in the HIP process.

The invention claimed is:

1. A temperature measuring apparatus of a thermocouple type comprising:
    a member formed of a high melting point metal carbide;
    a member formed of carbon system material, wherein said member formed of a high melting point metal carbide and said member formed of carbon system material are threadedly connected to connected portion, and the connected portion serves as a temperature measuring portion; and
    an electrically insulating spacer fixed to said member formed of carbon system material but not fixed to said member formed of a high melting point metal carbide, wherein said spacer is positioned to maintain a spacing between said member formed of a high melting point metal carbide and said member formed of carbon system material,
    wherein an end of said member formed of a high melting point metal carbide and an end of said member formed of carbon system material are connected to said connected portion which comprises a connecting member formed of either material of said member formed of a high melting point metal carbide or said member formed of carbon system material to serve as the temperature measuring portion.

2. The temperature measuring apparatus of a thermocouple type according to claim 1, wherein both said member formed of a high melting point metal carbide and said member formed of carbon system material have a rod shaped portion.

3. The temperature measuring apparatus of a thermocouple type according to claim 1, wherein the end of said member formed of a high melting point metal carbide is formed with an external thread, and said connecting member is formed with an internal thread to provide a thread connection therebetween.

4. The temperature measuring apparatus of a thermocouple type according to claim 1, wherein said carbon system material is graphite.

5. The temperature measuring apparatus of a thermocouple type according to claim 1, wherein said member formed of high melting point metal carbide is produced by covering a high melting point metal rod material with carbon powder, and the entirety is compressed in a high temperature condition to carbonize it.

6. The temperature measuring apparatus of a thermocouple type according to claim 1, wherein an outer circumferential portion of said member formed of high melting point metal carbide is ground, and the end thereof is formed with an external thread by supersonic process or discharge process.

7. The temperature measuring apparatus of a thermocouple type according to claim 1, wherein said high melting point metal carbide is carbide of either one kind of tungsten, tantalum, titanium, hafhium, niobium, or zirconium.

8. The temperature measuring apparatus of a thermocouple type according to claim 7, wherein said high melting point metal carbide is WC.

9. The temperature measuring apparatus of a thermocouple type according to claim 7, wherein said high melting point metal carbide is TaC.

10. The temperature measuring apparatus of a thermocouple type according to claim 7, wherein said high melting point metal carbide is TiC.

11. The temperature measuring apparatus of a thermocouple type according to claim 7, wherein said high melting point metal carbide is HfC.

12. The temperature measuring apparatus of a thermocouple type according to claim 7, wherein said high melting point metal carbide is NbC.

13. The temperature measuring apparatus of a thermocouple type according to claim 7, wherein said high melting point metal carbide is ZrC.

14. A method for producing the temperature measuring apparatus of a thermocouple type of claim 1, comprising the steps of:

covering a high melting point metal rod material with carbon powder;

compressing the entirety of said high melting point metal rod material in a high temperature condition to carbonize the high melting point metal rod material to thereby produce the member formed of a high melting point metal carbide;

forming a member made of a carbon system material; and threadedly connecting said member formed of a high melting point metal carbide and said member made of a carbon system material at a connected portion.

* * * * *

UNITED STATES PATENT AND TRADEMARK OFFICE
CERTIFICATE OF CORRECTION

PATENT NO. : 6,991,370 B2
DATED : January 31, 2006
INVENTOR(S) : Kofune et al.

It is certified that error appears in the above-identified patent and that said Letters Patent is hereby corrected as shown below:

<u>Title page,</u>
Item [73], Assignee, should read -- Kabushiki Kaisha Kobe Seiko Sho (Kobe Steel, Ltd.) Kobe (JP) --.

Signed and Sealed this

Twenty-eighth Day of March, 2006

JON W. DUDAS
*Director of the United States Patent and Trademark Office*